United States Patent
Reddoch

(10) Patent No.: US 6,687,946 B2
(45) Date of Patent: Feb. 10, 2004

(54) INFLATABLE WINDSHIELD WIPER ATTACHMENT AND METHOD

(76) Inventor: Jeffrey Reddoch, P.O. Box 82098, Lafayette, LA (US) 70598

( * ) Notice: Subject to any disclaimer, the term of this patent is extended or adjusted under 35 U.S.C. 154(b) by 213 days.

(21) Appl. No.: 09/766,258

(22) Filed: Jan. 18, 2001

(65) Prior Publication Data

US 2002/0092114 A1 Jul. 18, 2002

(51) Int. Cl.[7] ................................................ B60S 1/28
(52) U.S. Cl. ................................. 15/250.04; 15/250.41; 15/250.4
(58) Field of Search ........................... 15/250.4, 250.41, 15/250.04, 250.48, 250.01

(56) References Cited

U.S. PATENT DOCUMENTS

| 2,918,689 | A | * | 12/1959 | Pruett ............................ 15/29 |
| 4,406,672 | A | * | 9/1983 | Berz ............................... 95/68 |
| 4,754,517 | A | * | 7/1988 | Aldous ....................... 15/250.04 |
| 5,168,595 | A | * | 12/1992 | Naylor, Jr. .................... 15/250.4 |
| 5,426,814 | A | * | 6/1995 | Minnick .................... 15/250.04 |
| 5,442,834 | A | * | 8/1995 | Perry ............................ 15/250.4 |
| 5,539,951 | A | * | 7/1996 | Guell et al. ................ 15/250.04 |
| 5,778,483 | A | * | 7/1998 | Dawson ..................... 15/250.04 |
| 5,979,010 | A | * | 11/1999 | Dockery et al. ........... 15/250.04 |

FOREIGN PATENT DOCUMENTS

| DE | 3934203 | * | 4/1991 | ................ 15/250.4 |
| WO | 8001155 | * | 6/1980 | ................ 15/250.4 |

* cited by examiner

*Primary Examiner*—Gary K. Graham
(74) *Attorney, Agent, or Firm*—Robert N. Montgomery

(57) ABSTRACT

A windshield wiper blade attachment with pressurized inflatable scrubbing member. The scrubbing member includes a sustained fluid release delivery system for dispersing a solvent through a polymer matrix or mixed fiber composite material. The scrubbing member further includes a polymeric abrasive textured surface element that aids in effectively scrubbing the windshield. Pressurization of the scrubber is achieved with fluid from the vehicle pressure washer system. System fluid pressure inflates the member in a manner whereby, when it contacts the windshield, the wiper blade is displaced until such time as the scrubbing member loses sufficient fluid by seepage to allow the wiper blade to again make contact with the windshield.

12 Claims, 3 Drawing Sheets

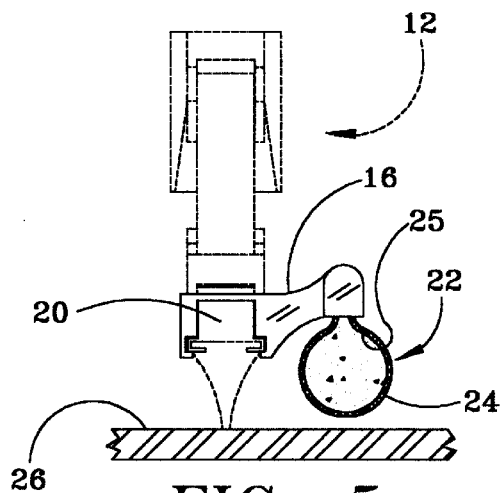
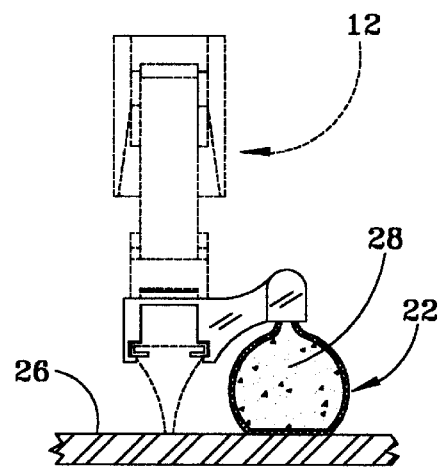
FIG. 5
FIG. 6
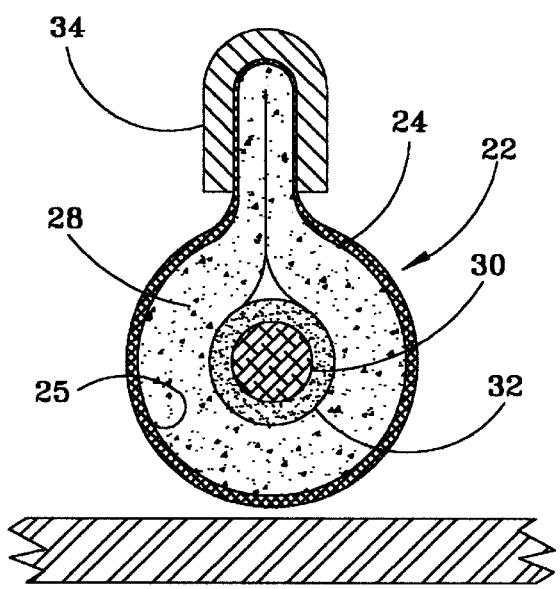
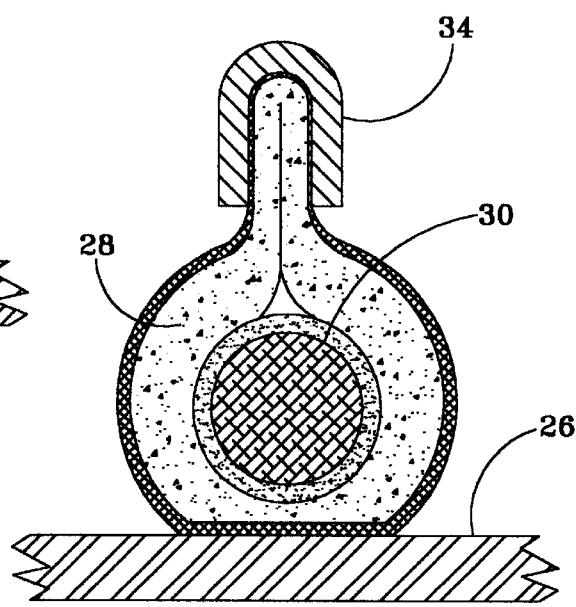
FIG. 7
FIG. 8

INFLATABLE WINDSHIELD WIPER ATTACHMENT AND METHOD

BACKGROUND OF THE INVENTION

1. Field of the Invention

This invention relates generally to windshield wipers and more particularly to an inflatable scrubber integral to a windshield wiper or attachable to an existing windshield wiper generally used for cleaning vehicle windshields.

2. General Background

In general, over the road vehicles are equipped with windshields and a system of oscillating wipers sweeping across the windshield to remove rain, water and the like, thus providing a driver with a clear view ahead. Most vehicles are now equipped with a pressure washer system as well, which provides washer fluid to assist the wipers in cleaning the windshield in a squeegee-like manner.

Windshield wipers are biased so as to apply a sufficient pressure on the wiper to maintain contact with the windshield at high wind speeds. However, such pressure is insufficient to adequately scrub the windshield in the presence of bugs, heavy dirt etc.

When the windshield becomes contaminated with bugs or other air or water borne residue, the wiper is incapable of removing it even with the aid of washer fluids. In most cases wiper action simply makes matters worse by smearing the residue. Oftentimes such debris is acetic or abrasive and may seriously damage the windshield wiper blade and therefore must be removed with solvent and hard hand scrubbing action.

Thus, a need exists for an attachment for windshield wipers that can effectively scrub and thus remove the debris while driving without harming the wiper blade.

SUMMARY OF THE INVENTION

The preferred embodiment provides a windshield wiper blade attachment for the effective removal of flying insects and other heavy airborne debris from a windshield by means of a pressurized inflatable scrubbing member. The scrubbing member includes a sustained release delivery system for dispersing a solvent through a polymer matrix or mixed fiber composite material. The scrubbing member further includes a polymeric abrasive textured surface element that aids in effectively scrubbing the windshield. Pressurization of the scrubber maybe achieved with fluid from the vehicle pressure washer system. System fluid pressure inflates the member in a manner whereby, when it contacts the windshield, the wiper blade is displaced until such time as the scrubbing member loses sufficient fluid by seepage to allow the wiper blade to again make contact with the windshield.

BRIEF DESCRIPTION OF THE DRAWINGS

For a further understanding of the nature and objects of the present invention, reference should be made to the following detailed description taken in conjunction with the accompanying drawings, in which, like parts are given like reference numerals, and wherein:

FIG. 5 is an end elevation view of the prior art wiper blade in contact with a windshield surface and a first embodiment of the preferred embodiment deflated;

FIG. 6 is an end elevation view of the prior art wiper blade with a first embodiment of the preferred embodiment partially inflated;

FIG. 7 is a partial cross-section of a second embodiment of the scrubber attachment deflated taken along sight line 7—7 as shown in FIG. 4; and FIG. 8 is a partial cross-section of a second embodiment of the scrubber attachment partially inflated taken along sight line 7—7 as shown in FIG. 4.

DETAILED DESCRIPTION OF THE PREFERRED EMBODIMENT

Figure 1:
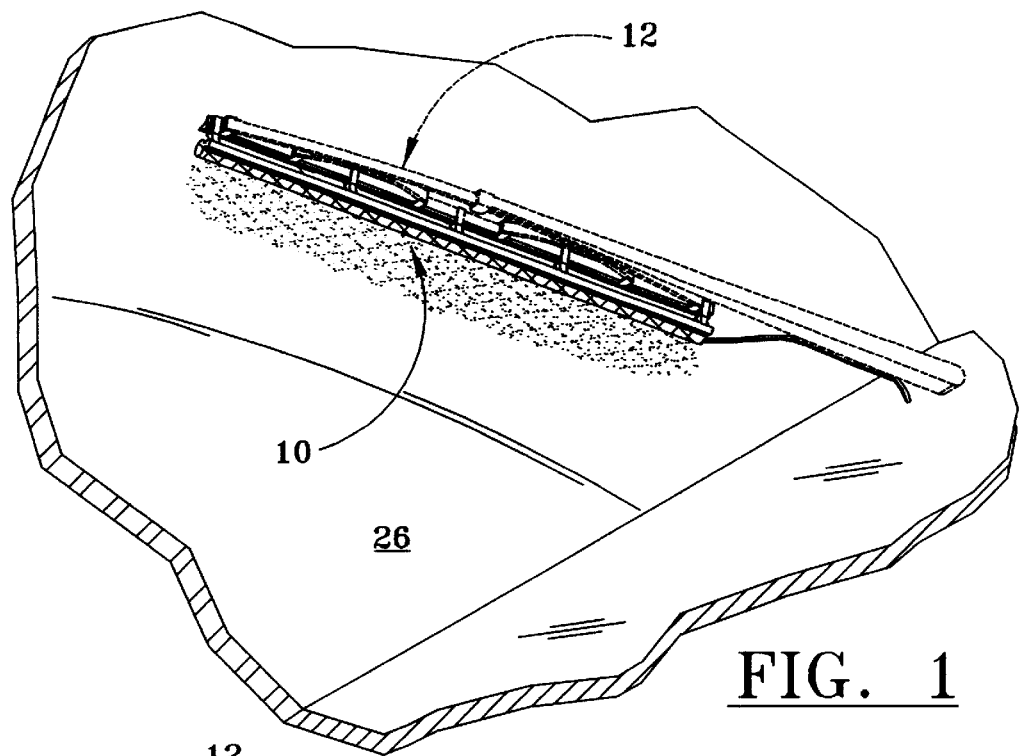
FIG. 1 is an isometric view of the wiper scrubbing attachment on a wiper blade in contact with a partial view of a vehicle windshield.
Figure 2:
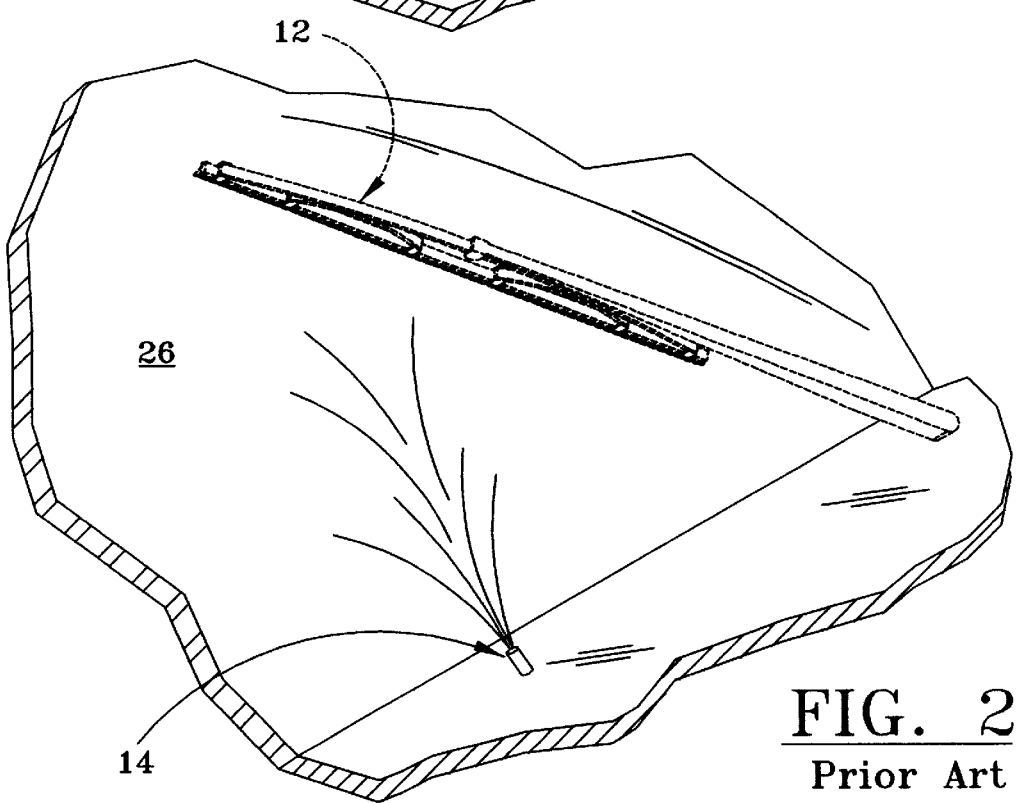
FIG. 2 is an isometric view of the windshield wiper and washer typical within the prior art.
Figure 3:
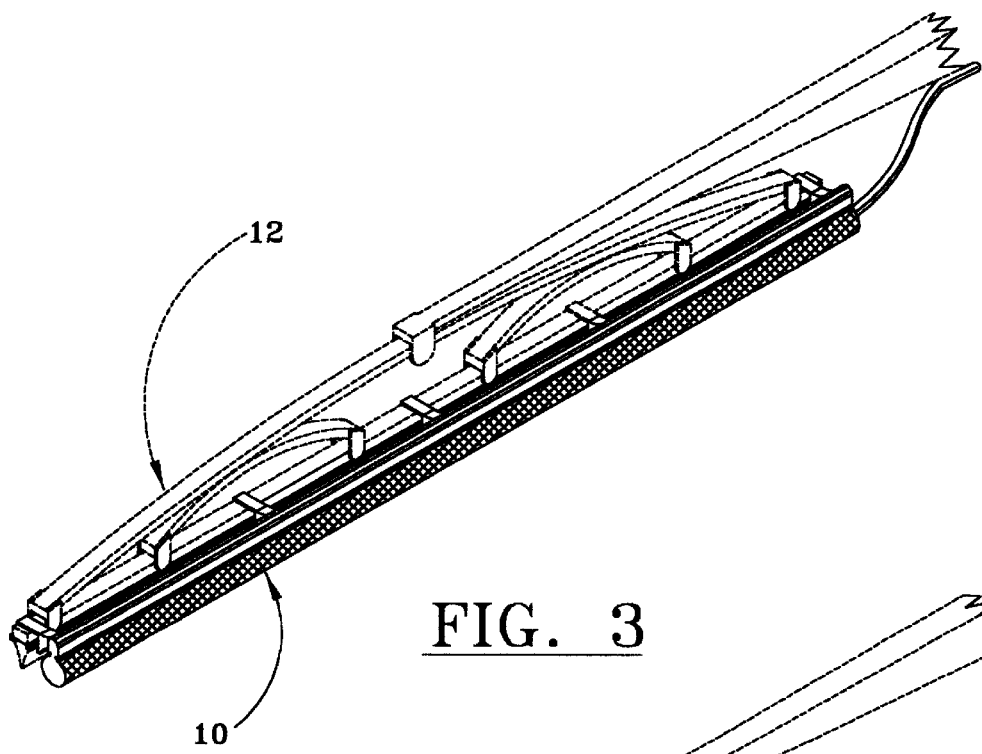
FIG. 3 is an isometric view of the preferred embodiment attached to a prior art wiper blade.
Figure 4:
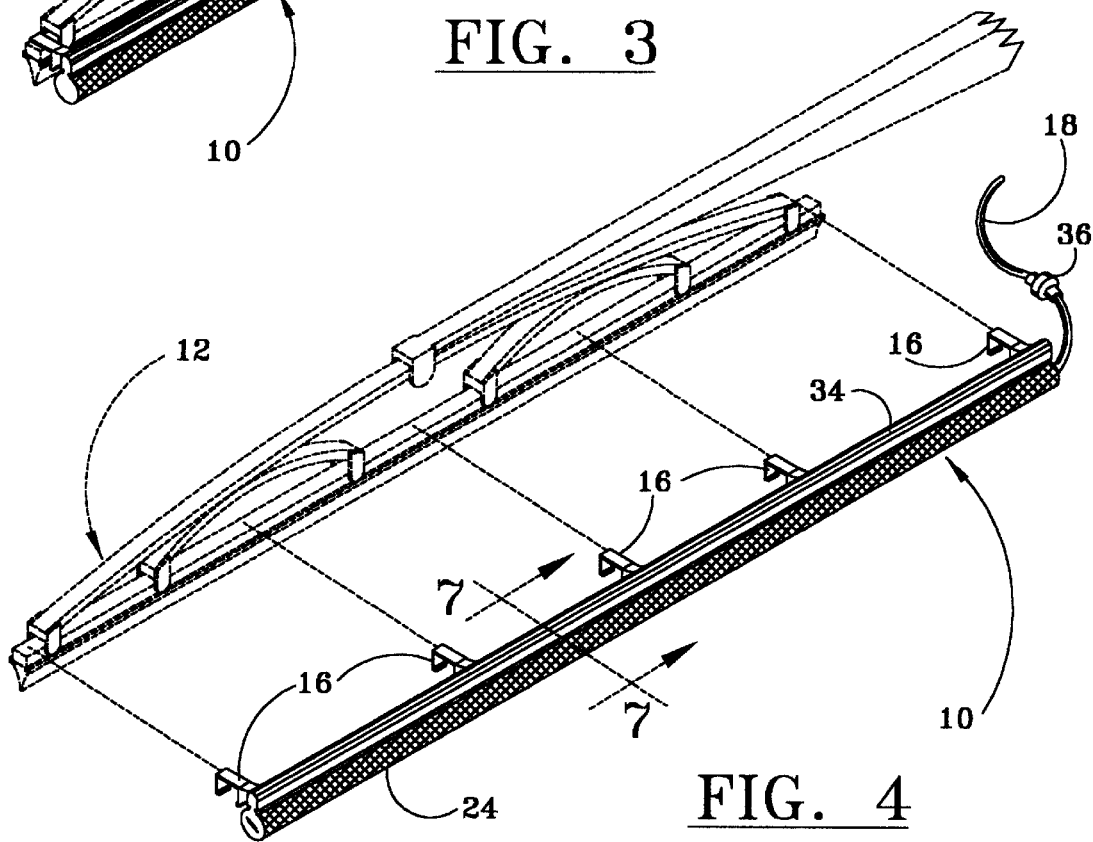
FIG. 4 is an exploded view of the preferred embodiment detached from the prior art wiper blade.

As first seen in FIG. 1, the present invention relates to a scrubbing attachment assembly 10 attachable to a windshield wiper assembly 12 of the type generally known within the art. The prior art generally includes a pressure washer system and windshield spray nozzles 14 as depicted in FIG. 2. Our scrubber attachment 10, as better seen in FIG. 3, is a snap-on element, as shown detached in FIG. 4, and is attachable to the wiper by several clips 16. A hose 18 connects the scrubber attachment 10 to the washer fluid system 14. As seen in FIG. 5, the scrubber's clips 16 easily snap over the metal retaining body 20 of most wiper assemblies 12. The scrubber's inflating element 22 is an open cell foam body member that extends the length of the scrubber assembly covered with a permeable outer skin 25. A polymeric lattice 24, as shown in FIG. 4, covers the outer skin and, thereby, enhances the abrading action of the scrubber on any debris or residue that may accumulate on the windshield 26. As seen in FIG. 6, when the windshield washer system is activated, pressure from the washer system 14 inflates the element 22, thereby elevating the wiper assembly 12. Inflatable element 22 may, in a first embodiment, be filled with a foam or sponge material 28, the foam or sponge material having a minute pore size, is fluid absorbent, has elastic shape memory, and a porous outer wall. When pressurized with a fluid, the foam or sponge material expands and, over a period of time, expels the engorged fluid through seepage through the porous outer wall 25. As a result, the scrubber 10 becomes semi-rigid when pressurized and is, therefore, an effective scrubbing element, especially when the lattice 24 is in contact with the surface 26.

In a second embodiment illustrated in FIG. 7, the foam material 28 is formed around an expandable balloon tube 32 which is expanded upon activation of the free flowing windshield wiper fluid 30 as seen in FIG. 8. In this case, as seen in FIG. 8, the balloon 32 when expanded, also expands the foam 28 and brings the scrubber 10 into contact with the surface 26. The balloon tube 32 may be porous or nonporous. If the balloon tube is pervious or porous fluid expelled from the Balloon tube 32 saturates the foam 28 as well and assist in wetting the windshield 26. If the balloon tube 32 is impervious or nonporous the foam 28 is expanded thereby bringing the lattis 24 into contact with the windshield 26. In this case the check valve 36 seen in FIG. 4 prevents the fluid from being returned to the washer system reservoir, thereby keeping the scrubber 10 inflated. It is therefore anticipated that the check valve 36 would be provide with pressure relief capability to allow for fluid by pass at a fixed rate, thereby allowing for deflation of the balloon tube 28. Also as seen in FIG. 7, the permeable outer skin 25 and a portion of the foam material 28 is pinched and adhered to the elongated channel 34, also seen in FIG. 4. The lattice 24 may be adhered to the outer skin 24 or also pinched within the channel 34.

In any case the scrubber 10 retains the washer fluid, which may also contain a solvent used to help dissolve insect residue or otherwise help clean oily residue from the windshield, for some period of time. When the momentary pressure from the washer system 14 is no longer present and the volume of fluid engorged by the scrubber has been sufficiently expended by seepage, the scrubber 10 will return to its normal deflated state and, thereby, return the windshield wiper to its normal contact position with the windshield.

It should be understood that using permeable foam material that is capable of expansion by volume saturation allows the scrubber 10 to remain inflated for some period of time without maintaining pressure from the washer system. Further, the washer system is not materially affected due to a loss of pressure.

Because many varying and different embodiments may be made within the scope of the inventive concept herein taught, and because many modifications may be made in the embodiments herein detailed in accordance with the descriptive requirement of the law, it is to be understood that the details herein are to be interpreted as illustrative and not in any limiting sense.

What is claimed is:

1. A windshield cleaning apparatus attachable to a vehicle windshield wiper blade and connectable to the vehicle windshield washer system, the apparatus comprising:
    a) an elongated expandable foam body having a tough, porous, rough textured outer skin;
    b) an elongated inflatable central balloon element within said foam body having a porous wall extending the length of said foam body;
    c) a means for connecting said balloon element to a pressurisable fluid source; and
    c) a means for removably attaching said foam body to a vehicle windshield wiper blade.

2. The windshield wiper attachment according to claim 1 wherein said flexible tube further comprises a check means for maintaining fluid pressure on said balloon element after pressure from said pressure source is released.

3. A windshield wiper attachment for cleaning a windshield of a vehicle attachable to an existing windshield wiper blade and a windshield pressure washer system, the wiper attachment comprising:
    a) an elongated channel having a plurality of clips spaced intermittently along its length;
    b) an elongated foam body member having a porous outer skin retained by said elongated channel;
    c) an elongated, expandable central balloon element extending the length of said foam body, said balloon element having a non-porous wall; and
    d) a flexible tube extending from one end of said balloon element connectable to a fluid pressure source.

4. The windshield wiper attachment according to claim 3 wherein said elongated foam body member is enclosed by an elongated polymeric lattice.

5. The windshield wiper attachment according to claim 3 wherein said pressure source is a windshield pressure washer system.

6. The windshield wiper attachment according to claim 3 wherein said foam body member expands upon fluid pressurization applied through said flexible tube.

7. The windshield wiper attachment according to claim 6 wherein said fluid is expressed through said porous outer skin, thereby allowing said foam body to contract.

8. A windshield wiper attachment for cleaning a windshield of a vehicle adaptable to a windshield wiper system and a windshield pressure washer system, the wiper attachment comprising an elongated channel having a plurality of clips spaced intermittently along its length adaptable to a windshield wiper blade, an elongated foam body member having a porous outer skin enclosed by an elongated polymeric lattice confined within said elongated channel, and a flexible tube extending from one end of said foam body which is connectable to a windshield pressure washer system.

9. The windshield wiper attachment according to claim 8 wherein said foam body member expands upon fluid pressurization applied from said windshield pressure washer system.

10. The windshield wiper attachment according to claim 9 wherein said fluid is expressed through said porous outer skin thereby allowing said foam body to contract thereby disengaging from said windshield when depressurized.

11. A method of installing and using a windshield wiper scrubber assembly, comprising the steps of;
    a) attaching a removable inflatable scrubber assembly to an existing vehicle windshield wiper blade assembly located in biased contact with a windshield;
    b) connecting said inflatable scrubber assembly to a fluid pump system;
    c) inflating said scrubber assembly by activating said fluid pump system thereby expanding said scrubber with fluid until said scrubber displaces said windshield wiper from contacting said windshield; and
    d) deflating said scrubber by deactivating said fluid pump until said windshield wiper again contact said windshield.

12. The method according to claim 11 wherein said steps further comprise the step of allowing said fluid to be gradually expressed from the surface of said scrubber member thereby expressing fluid onto said windshield.

* * * * *